United States Patent
Li et al.

(10) Patent No.: US 7,856,628 B2
(45) Date of Patent: Dec. 21, 2010

(54) METHOD FOR SIMPLIFYING COMPILER-GENERATED SOFTWARE CODE

(75) Inventors: Huiwen H. Li, Markham (CA); Raul Esteban Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 1369 days.

(21) Appl. No.: 11/337,369

(22) Filed: Jan. 23, 2006

(65) Prior Publication Data
US 2007/0174819 A1   Jul. 26, 2007

(51) Int. Cl.
*G06F 9/45* (2006.01)
(52) U.S. Cl. ..................................................... 717/159
(58) Field of Classification Search ................. 717/133, 717/137, 158, 152, 159; 719/316, 330, 310; 712/20, 11, 7, 24; 709/236; 707/103; 711/100, 711/202
See application file for complete search history.

(56) References Cited

U.S. PATENT DOCUMENTS

| | | | | |
|---|---|---|---|---|
| 6,647,546 | B1 * | 11/2003 | Hinker et al. | 717/137 |
| 6,820,264 | B1 * | 11/2004 | Bashkansky et al. | 719/310 |
| 7,100,019 | B2 * | 8/2006 | Norris et al. | 712/7 |
| 7,526,502 | B2 * | 4/2009 | Hall et al. | 707/103 |

\* cited by examiner

*Primary Examiner*—Tuan Anh Vu
(74) *Attorney, Agent, or Firm*—Yee & Associates, P.C.; Daniel P. McLoughlin

(57) ABSTRACT

A computer implemented method, system, and computer usable program code for simplifying compiler-generated software code by creating a stub routine for checking storage contiguity. A stub routine is generated for a subroutine. The stub routine is used to determine whether data is contiguous for the subroutine. A subroutine call in the code is replaced with a stub routine call for the stub routine. The subroutine call has at least one argument. The stub routine call includes each argument for the subroutine call. The code is executed. The stub routine is called by the stub routine call to determine whether data is contiguous for the subroutine.

17 Claims, 10 Drawing Sheets

FIG. 5
```
type TS                              ~500
      address : : %addr_tmp          ~502
      address : : %addr_desc         ~504
end type TS
type (TS) : : TS_1, TS_2,...TS_n TS_1%addr_tmp = 0
TS_1%addr_desc = &d-ptr1
call *sub1_stub(TS_1, n1)            ~506
      .
      .
      .
TS_n%addr_tmp = 0
TS_n%addr_desc = &d-ptrn
call *sub1_stub(TS_n, nn)
```

FIG. 6
```
subroutine *sub1_stub(TA,TB)         ~602
type TS
      address : : %addr_tmp          ~604
      address : : %addr_desc         ~608
end type TS
type (TS) : : TA                                    ~600
integer*4 : : TB if(TA%addr_tmp. eq. 0 then
      check contiguity from descriptor
      if (NotContig)                 614
         612~ allocate space and store the address in TA%addr_tmp>
                  <do copy-in>       ~616
      else
            <store the address of the original storage in TA%addr_tmp>
      endif
end if
call sub1(TA%addr_tmp, TB)           ~606
if (NotContig)  ~618
      <do copy-out>                  ~620
end if
end
```

FIG. 7

```
subroutine *sub1_stub(TA,TB)
type TS
        address : : %addr_tmp
        address : : %addr_desc
end type TS
type (TS) : : TA
integer*4 : : TB if (Data is not contiguous for each argument)
    if (TA%addr_tmp . eq. 0 then
            check contiguity from descriptor
            if (NotContig)
                    allocate space and store the address in TA%addr_tmp>
                    <do copy-in>
            else
                    <store the address of the original storage in TA%addr_tmp>
            endif
    end if
    call sub1 (TA%addr_tmp, TB)
    if (NotContig)
            <do copy-out>
    end if else
        <store the address of original storage in TA%addr_tmp>
        return (call sub 1 (TA%addr_tmp, TB))
    end if
```

702 encompasses the first `if` block; 704 encompasses the `else` block.

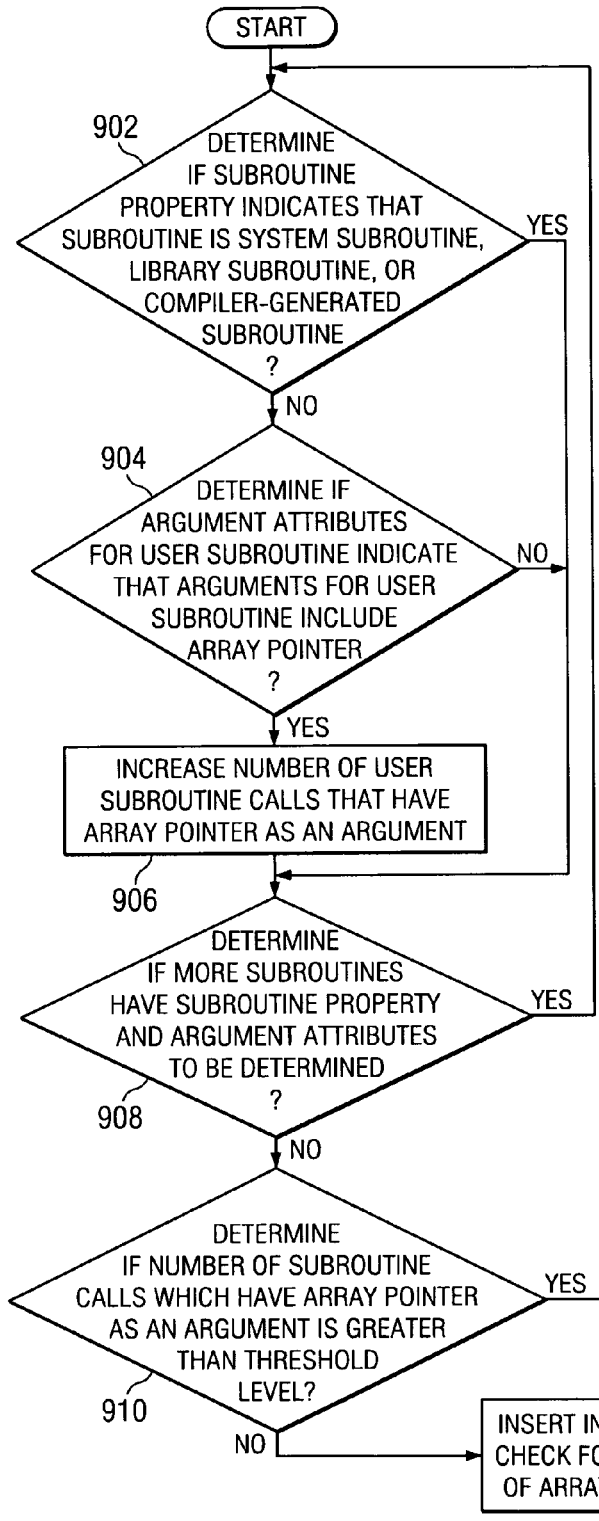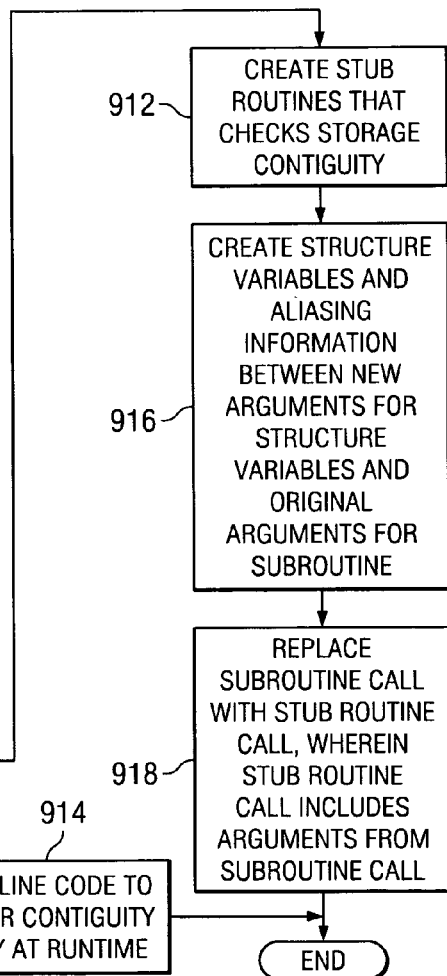
FIG. 9

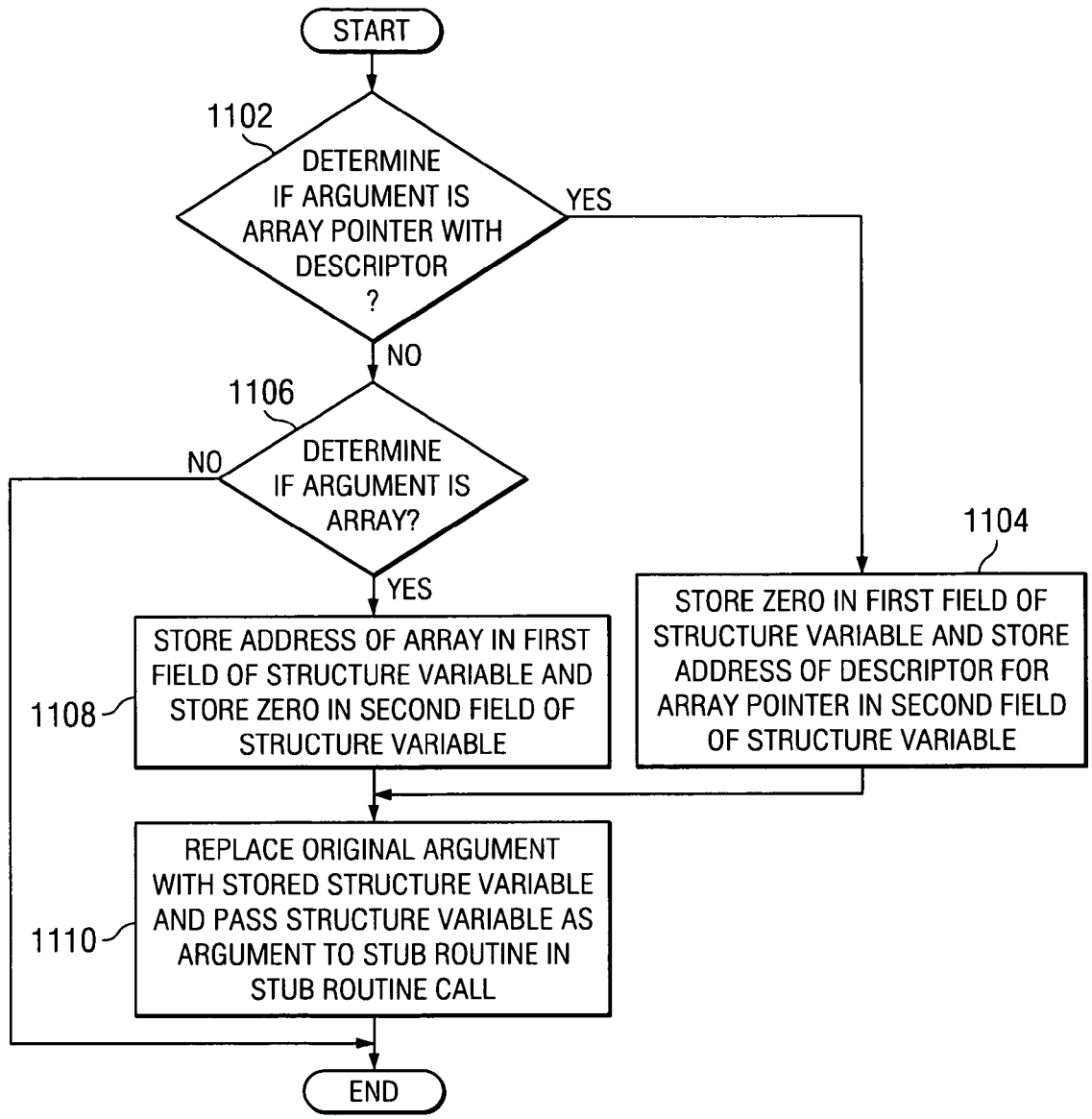

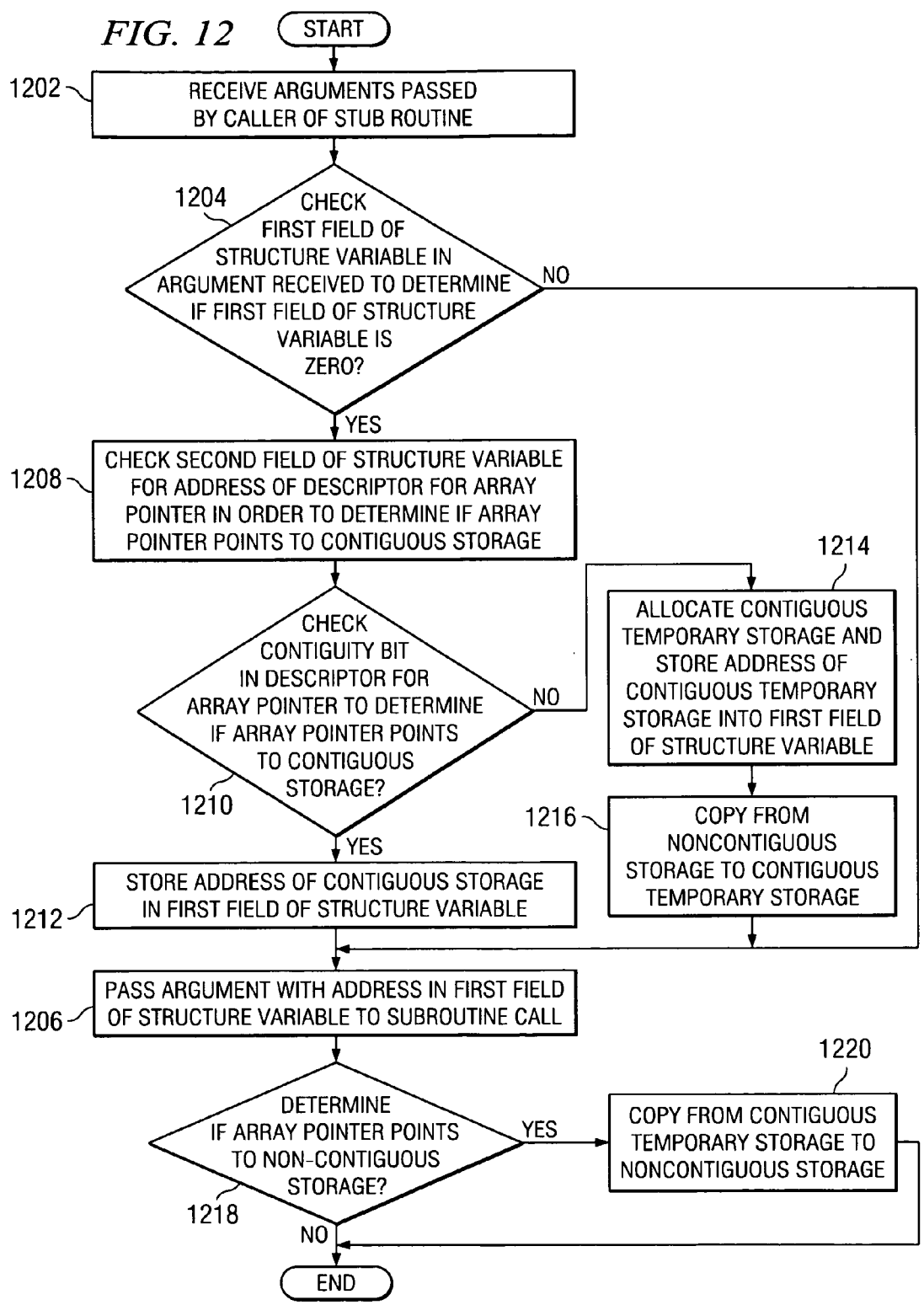

METHOD FOR SIMPLIFYING COMPILER-GENERATED SOFTWARE CODE

BACKGROUND OF THE INVENTION

1. Field of the Invention

The present invention relates generally to an improved data processing system and in particular to a computer implemented method, apparatus, and computer usable program code for improving performance in a data processing system. Still more particularly, the present invention provides a computer implemented method, apparatus, and computer usable program code for simplifying compiler-generated software code.

2. Description of the Related Art

An analysis of the expression and data relationships in a computer program requires knowledge of the control flow of the computer program. Control flow is the sequence of execution of instructions in the computer program. Control flow is determined at run time by input data and by control structures used in the computer program, such as subroutine calls, loops, and "if" statements. A subroutine is a sequence of instructions for performing a particular task. Most programming languages allow the programmer to define subroutines, allow arguments to be passed to the subroutine, and allow one or more return values to be passed back. Understanding the control flow becomes more complicated due to conditional control structures, such as "if" statements. One of the primary reasons for conducting a control flow analysis for software code in a compiler is to produce more efficient computer programs. Compiler optimization techniques are optimization techniques that have been programmed into a compiler, and control flow analysis for software code is an example of a compiler optimization technique that has been programmed into many compilers. Control flow analysis for software code is a compiler optimization technique that analyzes the control of flow for software code. Code is a set of instructions for a computer in some programming language. The word code is often used to distinguish instructions from data. Software code is computer instructions stored in volatile storage in contrast to firmware instructions stored in non-volatile storage. Software code includes both source code written by humans and executable machine code produced by assemblers or compilers.

Optimization techniques are generally automatically applied by the compiler whenever they are appropriate. Because programmers no longer need to manually apply these techniques, programmers are free to write source code in a straightforward manner, expressing their intentions clearly. Then, the compiler can choose a more efficient way to handle the implementation details.

Control flow analysis for software code can become problematic for computer programs written in some programming languages when analyzing the use of arrays. An array is a collection of identically typed data items distinguished by their indices, or subscripts. The number of dimensions an array can have depends on the programming language implementing the array, but the number of dimensions is usually unlimited. In some programming languages, an array pointer is an address that can point to a contiguous array, that is, an array stored in contiguous storage, or a non-contiguous array, that is, an array stored in non-contiguous storage. Contiguous storage is storage that is physically adjacent on a disk volume or in memory, whereas non-contiguous storage is storage that is not physically adjacent on a disk volume or in memory.

Because an array pointer may be passed as an argument to a subroutine that has a dummy argument which expects a reference to contiguous storage, many compilers execute a gather/scatter operation. A subroutine requiring a gather/scatter operation is a subroutine that expects to receive a reference to a contiguous storage and a subroutine for which the array pointer points to a non-contiguous storage. A gather/scatter operation is an operation in which a compiler copies an array to a contiguous temporary array prior to the subroutine call, and passes a reference to the copy in the contiguous temporary array as the actual argument to the subroutine. A contiguous temporary array is a contiguous array that a stub routine, compiler, or a subroutine allocates for temporary use. After the call to the subroutine has completed, the compiler copies the contiguous temporary array back to the original array.

Such a gather/scatter operation is frequently expensive in terms of time and resources consumed. A gather/scatter operation may be superfluous in instances when the array is already contiguous. Some compilers eliminate the gather/scatter operation when the array is already contiguous, but a compiler cannot in general determine in advance if an array is contiguous. In order to determine if an array is contiguous, a compiler must insert inline code to check for the contiguity of an array at runtime. For example, the IBM® XL FORTRAN compiler and the Sun® FORTRAN compiler insert inline code to check for the storage contiguity of an array at runtime. An IBM® XL FORTRAN compiler is a product of International Business Machines Corporation, located in Armonk, N.Y. IBM is a trademark of International Business Machines Corporation in the United States, other countries, or both. A Sun® FORTRAN compiler is a product of Sun Microsystems, Inc., located in Santa Clara, Calif. Sun is a trademark of Sun Microsystems, Inc. in the United States, other countries, or both. These compilers are offered only as illustrative examples and not to imply any limitation for embodiments of the present invention.

The insertion of inline code to check the storage contiguity of an array at runtime is a common solution to the problem of superfluous gather/scatter operations. This runtime check, however, introduces other problems. For example, the inserted inline code may contain numerous conditional control structures, such as "if" statements, to determine if a gather/scatter operation is required. The inserted inline code may also contain complicated loop nests to execute a gather/scatter operation. The insertion of inline code may produce significant code bloating, which may negatively affect the length of time required for compilation and the amount of code compiled. Furthermore, the insertion of inline code may also negatively affect the runtime performance of the compiled code. Additionally, the insertion of inline code makes understanding the control flow much more complicated, hindering the operations of compilers used to generate more efficient code.

SUMMARY OF THE INVENTION

Embodiments of the present invention provide a computer implemented method, apparatus, and computer usable program code for simplifying compiler-generated software code. A stub routine is generated for a subroutine. The stub routine is used to determine whether data is contiguous for the subroutine. A subroutine call in the code is replaced with a stub routine call for the stub routine. The subroutine call has at least one argument. The stub routine call includes each argument for the subroutine call. The code is executed. The stub routine is called by the stub routine call to determine whether data is contiguous for the subroutine.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

FIG. 5 is a diagram illustrating pseudo code for outlining the checking of storage contiguity into a stub routine in accordance with an illustrative embodiment of the present invention;

FIG. 6 is a diagram illustrating pseudo code for a stub routine in accordance with an illustrative embodiment of the present invention;

FIG. 7 is a diagram illustrating pseudo code made more advanced for a stub routine in accordance with an illustrative embodiment of the present invention;

FIG. 9 is a flowchart illustrating a process for determining whether there is a need to create a stub routine for checking storage contiguity in accordance with an illustrative embodiment of the present invention;

FIG. 11 is a flowchart of a process for calling a stub routine to check storage contiguity in accordance with an illustrative embodiment of the present invention; and FIG. 12 is a flowchart of a process for a stub routine checking storage contiguity in accordance with an illustrative embodiment of the present invention.

DETAILED DESCRIPTION OF THE PREFERRED EMBODIMENT

Figure 1:
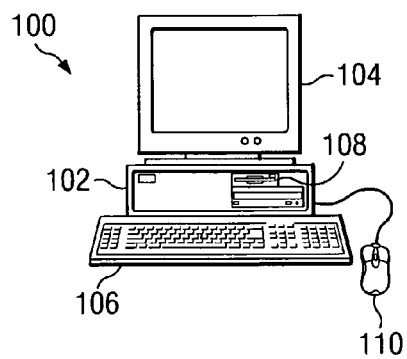
FIG. 1 is a pictorial representation of a data processing system in which the present invention may be implemented in accordance with an illustrative embodiment of the present invention.

With reference now to the figures and in particular with reference to FIG. 1, there is shown a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with computer 100, such as, for example, a joystick, touchpad, touch screen, trackball, microphone, and the like. Computer 100 can be implemented using any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
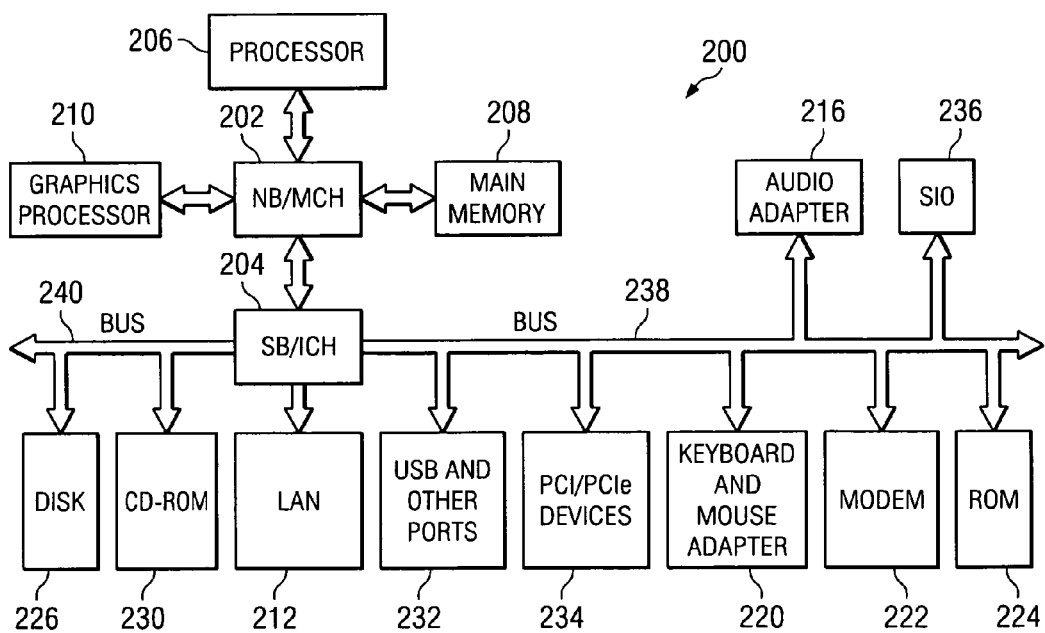
FIG. 2 is a block diagram of a data processing system that may be implemented as a server in which the present invention may be implemented in accordance with an illustrative embodiment of the present invention.

With reference now to FIG. 2, a block diagram of a data processing system is shown in which aspects of the present invention may be implemented. Data processing system 200 is an example of a computer or other data processing system, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 are coupled to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204 through bus 238.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provides calls to the operating system from Java® programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of one embodiment of the present invention, when such embodiment is implemented on a data processing system having the architecture of exemplary data processing system 200, are performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
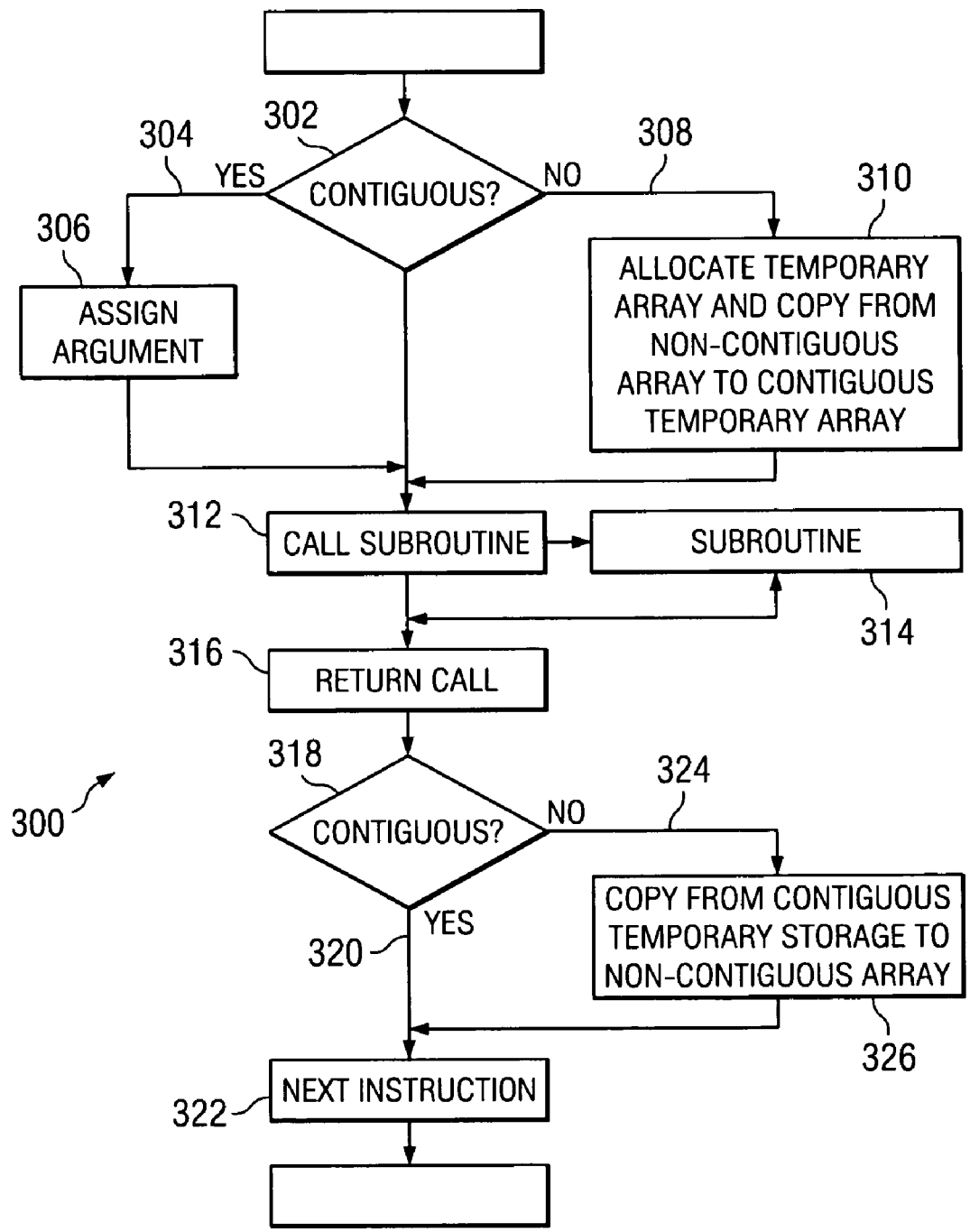
FIG. 3 is a block diagram illustrating a control flow graph for known software code.

FIG. 3 is a block diagram illustrating a section 300 of a control flow graph for known software code. Embodiments of the present invention may simplify control flow analysis for known software code by simplifying such a control flow graph. A compiler uses source code to generate intermediate code that is internal to the compiler. Then the compiler uses intermediate code to generate a control flow graph. Sections of the control flow graph for known software code may represent inserted inline code, which may contain numerous conditional control structures. Graph section 300 represents software code, including inserted inline code that determines if a gather/scatter operation is required and that calls a subroutine. Conditional control structures, such as "if contiguous?" statement 302, determine if an array storage is contiguous. If statement 302 determines that the array storage is contiguous 304, the inline code assigns 306 an argument to the array pointer for the array storage determined to be contiguous. If statement 302 determines that the array storage is not contiguous 308, the inline code allocates 310 a contiguous temporary array and copies from the non-contiguous array to the contiguous temporary array. After determining whether the array storage is contiguous and executing the appropriate conditional branch for the conditional control structure, the inline code calls 312 subroutine 314, passing arguments to subroutine 314. After the inline code calls 312 subroutine 314, then subroutine 314 returns the call 316 to the inline code. After subroutine 314 returns the call 316 to the inline code, the inline code determines if the array storage is contiguous 318. If statement 318 determines that the array storage is contiguous 320, the inline code executes the next instruction 322. If statement 318 determines that the array storage is not contiguous 324, the inline code copies from the contiguous temporary array to the non-contiguous array 326. Numerous insertions of inline code produce a conditional control structure for software code such as the control graph in FIG. 3, which makes building the control flow graph for software code complicated, hindering the efficiency of compilers in the compilation of source code.

Illustrative embodiments of the present invention provide a computer implemented method, apparatus, and computer usable program code that may simplify control flow analysis for software code by simplifying a control flow graph, such as the control flow graph in FIG. 3. A stub routine is created for checking storage contiguity and executing a gather/scatter operation. Storage contiguity is the characteristic of storage that is physically adjacent on a disk volume or in memory. A stub routine is a small program routine that functions as a substitute for some other code, such as a subroutine. The stub routine accepts a request, including arguments, from a calling routine, and then forwards the request to another procedure. When the other procedure has completed its service, the other procedure returns the results of the service to the stub routine, which passes the results of the service back to the calling program that made the request. Illustrative embodiments of the present invention use such stub routines specifically to check array storage contiguity.

Figure 4:
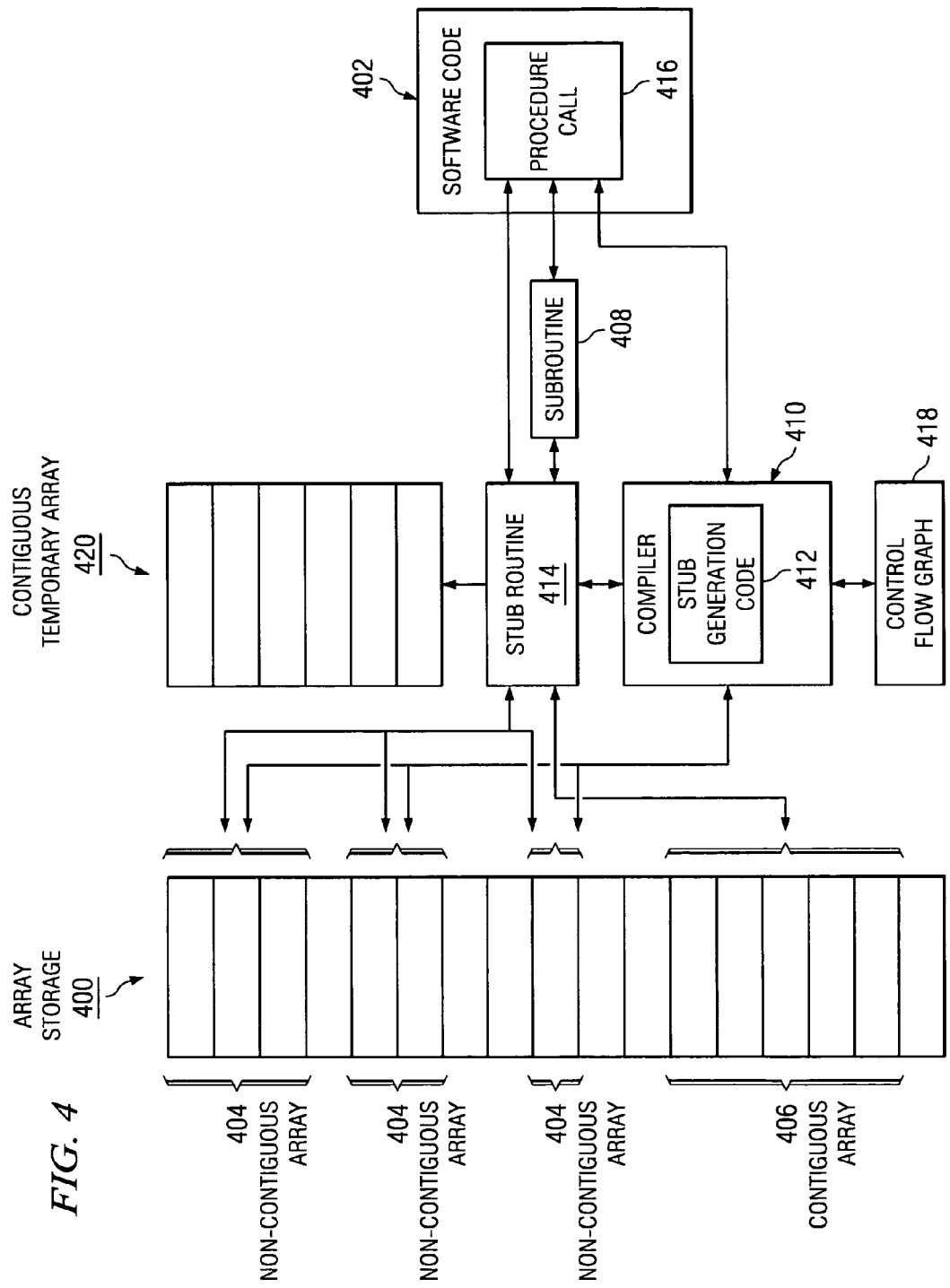
FIG. 4 is a block diagram illustrating array storage for a computer program in accordance with an illustrative embodiment of the present invention.

FIG. 4 is a block diagram illustrating components used in compiling software code in accordance with an illustrative embodiment of the present invention. In this example, array storage 400 accessed by a computer program, such as software code 402, may be implemented in a main memory, such as main memory 208 in FIG. 2, or a cache. An array pointer can point to non-contiguous array 404 or contiguous array 406 in array storage 400. Subroutine 408 expects a reference to contiguous storage, such as contiguous array 406. Compiler 410 cannot determine in advance whether an array, such as non-contiguous array 404, is contiguous. Therefore, to check for the contiguity of non-contiguous array 404 and contiguous array 406 at runtime, compiler 410 invokes stub generation code 412 to generate stub routine 414 while the source code for software code 402 is compiled. Compiler 410 also modifies procedure call 416 to call stub routine 414 instead of calling subroutine 408, modified before the source code for software code 402 is compiled. Complier 410 builds control flow graph 418 based upon intermediate code, which is based on the source code, in order to generate more efficient code. Control flow graph 418 may be a simplified version of the control flow graph in FIG. 3. Compiler 410 compiles the source code to generate software code 402. Compiler 410 simplifies control flow analysis for software code based upon building a simplified version of control flow graph 418, which is based on intermediate code, which in turn is based on the source code.

After compiler 410 compiles the source code to generate software code 402, software code 402 is executed, and procedure call 416 calls stub routine 414 to check for the contiguity of the data for subroutine 408. In one exemplary case for the particular example shown in FIG. 4, stub routine 414 will check for continuity of non-contiguous array 404. After determining that non-contiguous array 404 is not contiguous, stub routine 414 executes a gather/scatter operation. In executing a gather/scatter operation, stub routine 414 copies non-contiguous array 404 to contiguous temporary array 420 prior to calling subroutine 408. Stub routine 414 uses a pointer to the copy in contiguous temporary array 420 as the actual argument for subroutine 408. An argument is a value or reference for a subroutine or stub routine, a value or reference passed by a caller. A caller is a routine that calls a subroutine or a stub routine. After subroutine 408 has completed, stub routine 414 copies contiguous temporary array 420 back to non-contiguous array 404.

In another exemplary case for the particular example shown in FIG. 4, when software code 402 is executed, procedure call 416 calls stub routine 414 to check for the contiguity of contiguous array 406. After determining that contiguous array 406 is contiguous, stub routine 414 skips the gather/scatter operation. Stub routine 414 uses a pointer to contiguous array 406 as the actual argument for subroutine

408. After subroutine 408 has completed, contiguous array 406 has the result from subroutine 408.

Illustrative embodiments of the present invention compile software code by creating stub routine 414 with a caller friendly interface for each called subroutine 408 that may require a gather/scatter operation. An interface is caller-friendly if the interface may accept arguments of different types and different dimensions, such as scalars, array pointers, one dimensional arrays, and multi-dimensional arrays. Stub routine 414 performs a check for storage contiguity for each relevant argument, and contains a call to the subroutine 408. Software code 402 does not need to have any inline code inserted. Software code 402 simply contains a number of direct calls to stub routine 414. When software code 402 contains a large number of subroutine calls, such as procedure call 416, with array pointer arguments, the creation of stub routine 414 greatly decreases the number of conditional data flow paths. The creation of stub routine 414 may simplify the control flow analysis for software code, as indicated by a comparison of FIG. 8, which is a detailed illustration of an example of control flow graph 418, and the control flow graph in FIG. 3. As a result, the use of stub routine 414 for each called subroutine 408 requiring a gather/scatter operation may speed up the process of compiling source code without substantial impact on the runtime performance.

In order to minimize the amount of additional code introduced by creating stub routine 414 for checking storage contiguity, the arguments received and passed by stub routine 414 are treated such that stub routine 414 can receive and pass different types or different dimensions of arguments. For example, the arguments that stub routine 414 may receive and pass include scalars, array pointers, one-dimensional arrays, and multi-dimensional arrays. The caller-friendly capability to receive and pass different types or different dimensions of arguments allows at most one stub routine 414 to be created for each subroutine 408 being called, regardless of how many calls are made to each subroutine 408 or what kind of parameters are received and passed. If stub routine 414 accepts only one dimensional arrays and receives a three dimensional array as an argument, an error occurs due to overloading. If stub routine 414 is caller-friendly, the number of stub routines created is reduced for each compilation unit, which may be a file or a subroutine.

Illustrative embodiments of the present invention outline the checking of storage contiguity into stub routine 414 in order to reduce the burden of the optimizer for compiler 410 and therefore improve the performance of compilation time. In contrast to inserting inline code, outlining the checking of storage contiguity creates stub routine 414, which is not inserted as inline code, but executed as an interface to subroutine 408.

FIG. 5 is a block diagram illustrating pseudo code for outlining the checking of storage contiguity into a stub routine in accordance with an illustrative embodiment of the present invention. The compiler, which may be the same as compiler 410, uses stub routine generation code, which may be the same as stub routine generation code 412, to create a new structure variable for arguments at the caller side of the software code, which may be the same as software code 402, all in FIG. 4. A structure variable is a variable that is structured to contain separate items of data, such as an item of data in a first field of the structure variable and another item of data in a second field of the structure variable. A field is an area of a database record into which a particular item of data is entered. The compiler creates a structure variable that contains separate items of data in different fields because the structure variable is used as a single argument passed by a procedure call, such as procedure call 416, and expected by a subroutine, such as subroutine 408, both in FIG. 4. A stub routine, such as stub routine 414 in FIG. 4, requires the separate items of data in different fields for checking storage contiguity.

The compiler creates a structure variable such as TS 500. TS 500 has a first field, % addr_tmp 502, and a second field, % addr_desc 504. If an argument is an array pointer with a descriptor, the compiler stores a zero in the first field, % addr_tmp 502, and stores the address of the descriptor for the array pointer in the second field, % addr_desc 504. An address is an unsigned integer used to select one fundamental element of storage from a computer's main memory or other storage device. As an illustrative example of an array pointer, a FORTRAN pointer is implemented using a descriptor. A descriptor for an array pointer has all the information for an array that is used in a stub routine. If an argument is an array, the compiler stores the address of the array in the first field, % addr_tmp 502, and stores a zero in the second field, % addr_desc 504. Then the complier replaces the original argument with stored structure variable TS 500, which is passed to the stub routine in a stub routine call 506. A stub routine call is the invoking of execution for the stub routine, similar to a subroutine call, which is the invoking of execution for a subroutine.

FIG. 6 is a block diagram illustrating pseudo code for a stub routine in accordance with an illustrative embodiment of the present invention. The pseudo code for stub routine 600, which may be the same as stub routine 414, may be implemented for software code, which may be the same as software code 402, both in FIG. 4. The compiler, which may be the same as compiler 410, uses stub routine generation code, which may be the same as stub routine generation code 412, both in FIG. 4, to create stub routine 600. When called by a procedure call, such as procedure call 416 in FIG. 4, stub routine 600 receives arguments 602 passed by the caller of stub routine 600. Arguments 602 may be the same as structure variable TS 500 in FIG. 5. Stub routine 600 checks the first field, % addr_tmp 604, of the argument received to determine if the first field, % addr_tmp 604, is zero. First field, % addr_tmp 604, of the argument may be the same as first field, % addr_tmp 502, in FIG. 5. If the first field, % addr_tmp 604, is not zero, the argument is for an array. When the argument is an array, the address of the array is already in the first field, % addr_tmp 604. The address of the storage which stub routine 600 passes 606 to the original sub routine is always stored in the first field, % addr_tmp 604.

If the first field, % addr_tmp 604, is zero, the argument is for an array pointer with a descriptor. Then stub routine 600 checks the second field, % addr_desc 608, of the argument passed for the address of the descriptor for the array pointer in order to determine if the array pointer points to contiguous storage. By checking a contiguity bit in the descriptor for the array pointer, stub routine 600 determines if the array pointer points to contiguous storage. A contiguity bit is an indicator whether an array is stored in contiguous storage or non-contiguous storage. If the array pointer points to contiguous storage, stub routine 600 stores the address of the contiguous storage in the first field, % addr_tmp 604. If the array pointer points to non-contiguous storage, stub routine 600 executes stub routine section 610, which allocates 612 a contiguous temporary storage and then stub routine 600 stores 614 the address of the contiguous temporary storage into the first field, % addr_tmp 604. A contiguous temporary storage is contiguous storage that a stub routine, compiler, or a sub routine allocates for temporary use. Then stub routine 600 copies 616 from the non-contiguous storage to the contiguous temporary storage. The address of the storage which stub routine 600 passes 606 to the original sub routine is always stored in the first field, %addr_tmp 604. Upon return from the subroutine call, stub routine 600 checks 618 if the array pointer points to non-contiguous storage. If the array pointer points to non-contiguous storage, stub routine 600 copies 620 from the contiguous temporary storage to the non-contiguous storage.

If the arguments 602 passed by the caller of stub routine 600 indicate a scalar, stub routine 600 does not need to make all of these checks, and stub routine 600 simply passes the address for the scalar to the subroutine. A scalar is any data type that stores a single value, such as a number or a Boolean value, as opposed to an aggregate data type that has many elements, such as an array. Control flow analysis for software code is simplified through the implementation of a stub routine, such as stub routine 600, for checking storage contiguity.

FIG. 7 is a block diagram illustrating pseudo code made more advanced for a stub routine in accordance with an illustrative embodiment of the present invention. The pseudo code is further refined for a stub routine where the total number of arguments for each subroutine is less than a pre-specified minimum and data is contiguous for each subroutine. Data is numbers, characters, images, or other methods of recording, in a form which can be assessed by a human or input into a computer, stored on a disk volume or in memory, processed in the computer, or transmitted on some digital channel. Data is contiguous for a subroutine if the data for the subroutine is physically adjacent on a disk volume or in memory. If the number of arguments for each subroutine is greater than a pre-specified minimum, further improvements in simplification may not be possible. A pre-specified minimum is a number of arguments for each subroutine that is specified in advance, which may be two arguments, for example. A compiler, which may be the same as compiler 410, invokes stub generation code, which may be the same as stub generation code 412, both in FIG. 4, to create stub routine 700. Stub routine 700 may include a portion, such as portion 702, for a non-contiguous condition. The portion may generate a stub routine section, such as stub routine section 610 in FIG. 6. However, portion 702 is not executed when data is contiguous for each argument, such that an optimizer for a compiler may remove portion 702 of stub routine 700 at a high level of optimization.

Figure 8:
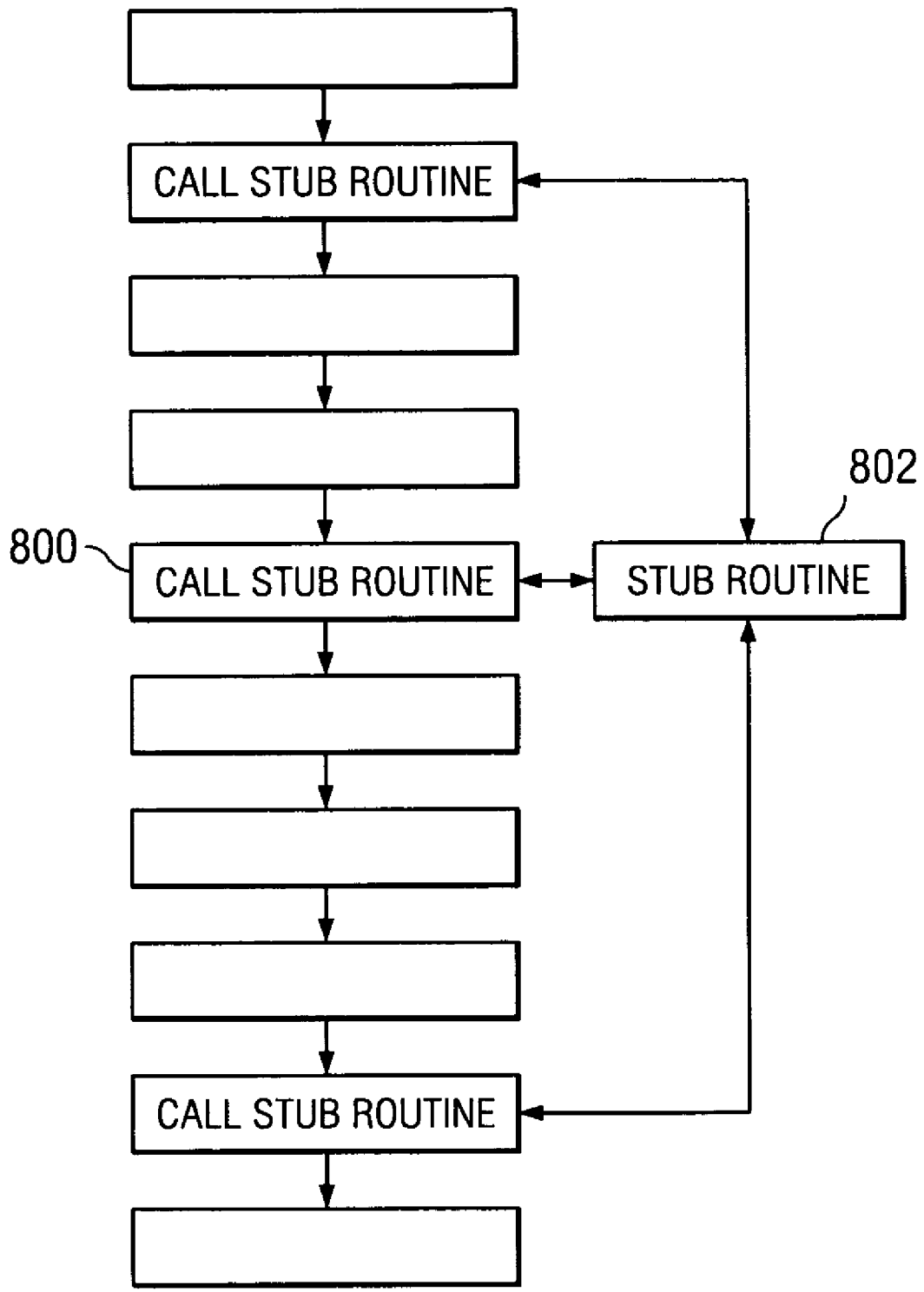
FIG. 8 is a block diagram illustrating a control flow graph in accordance with an illustrative embodiment of the present invention.

FIG. 8 is a block diagram illustrating a control flow graph in accordance with an illustrative embodiment of the present invention. This graph is an example of control flow graph 418 in FIG. 4 and is for software code, which may be, for example, software code 402 in FIG. 4. Graph section 800 represents software code implemented in accordance with an illustrative embodiment of the present invention. But in contrast to the conditional control structure represented by graph section 300 in FIG. 3, graph section 800 does not include conditional statements, such as "if contiguous?" statement 302 in FIG. 3, to determine if array storage is contiguous. Graph section 800 also does not include branches, such as assign argument 306 or allocate a contiguous temporary array 310 in FIG. 3. Instead, graph section 800 contains a simple call to stub routine 802, which may be the same as stub routine 414 in FIG. 4. Simple calls to stub routine 802 make building the control flow much simpler, simplifying the operations of compilers to generate more efficient code.

Prior to simplification of control analysis, a compiler implementing an embodiment of the present invention, which may be the same as compiler 410, may determine if there is a need to create a stub routine, which may be the same as stub routine 414, both in FIG. 4, for checking storage contiguity.

FIG. 9 is a flowchart illustrating a process for determining whether there is a need to create a stub routine for checking storage contiguity, in accordance with an illustrative embodiment of the present invention. A compiler, such as compiler 410 in FIG. 4, determines the need to create stub routines by determining subroutine properties and argument attributes of each subroutine. The compiler determines if a subroutine property indicates that a subroutine is a system subroutine, a library subroutine, or a compiler-generated subroutine (step 902). A subroutine property is an indication of the subroutine type, such as a system subroutine, a library subroutine, a compiler-generated subroutine, or a user subroutine. A user subroutine is a subroutine generated by a user. An argument attribute is an indication of an argument type, such as an array, an array pointer, or a scalar. If the compiler determines a subroutine property indicates that a subroutine is a system subroutine, a library subroutine, or a compiler-generated subroutine, the compiler does not need to create a stub routine for calls to the subroutine. Then, the compiler determines whether more subroutines which have a subroutine property to be determined are present. If the compiler determines a subroutine property indicates that a subroutine is not a system subroutine, a library subroutine, or a compiler-generated subroutine, then the subroutine property indicates that the subroutine is a user subroutine, for which the compiler may need to create a stub routine for calls to the subroutine. Then, the compiler determines whether the argument attributes for the user subroutine indicate that the compiler may need to create a stub routine for calls to the user subroutine.

The compiler determines if the argument attributes for the user subroutine indicate that the arguments for the user subroutine include an array pointer (step 904). If the compiler determines the argument attributes for the user subroutine indicate that the arguments for the user subroutine do not include an array pointer, the compiler does not need to create a stub routine for the call to the subroutine. Then the compiler will determine if there are more subroutines which have argument attributes to be determined (step 908). If the compiler determines the argument attributes for the user subroutine indicate that the arguments for the user subroutine include an array pointer, the compiler may need to create a stub routine for calls to the subroutine. The compiler determines the need to create a stub routine for calls to the subroutine based upon the total number of user subroutine calls that have an array pointer as an argument.

If the arguments for the user subroutine include an array pointer, the compiler increases the number of user subroutine calls that have an array pointer as an argument, that is, the number of user subroutine calls which need to check storage contiguity (step 906). The compiler increases the number of user subroutine calls that have an array pointer as an argument by the number of instances of calls to that user subroutine. After increasing the number of user subroutine calls that have an array pointer as an argument, the compiler determines if more subroutines have a subroutine property and argument attributes to be determined (step 908). If the compiler determines more subroutines have a subroutine property and argument attributes to be determined, the compiler returns to the step (step 902) that determines a subroutine property. If the compiler determines no more subroutines have a subroutine property and argument attributes to be determined, the compiler determines if the number of subroutine calls that have an array pointer as an argument is greater than a threshold level (step 910). The threshold level is a fixed value based upon experiments using a benchmark. If the threshold level is set too high, an improvement in run time due to the lack of stub routine use may be more than offset by a longer compilation time. If the threshold level is set too low, an improvement in compilation time due to stub routine use may be more than offset by a longer runtime. An example of a threshold level is 180. In this example, if software code, which may be the same as software code 402 in FIG. 4, has 185 subroutine calls which have an array pointer as an argument, the compiler begins the process to create stub routines to check storage contiguity. In some illustrative embodiments of the present invention, rather than making a determination to generate stub routines based on the number of subroutine calls for all subroutines that have an array pointer as an argument, the compiler makes the determination to generate stub routines only for individual subroutines for which the number of subroutine calls for that individual subroutine that have an array pointer as an argument is greater than an individual subroutine threshold level.

If the number of subroutine calls that have an array pointer as an argument is greater than the threshold level, the compiler creates a stub routine that checks storage contiguity (step 912). If the number of subroutine calls that have an array pointer as an argument is not greater than the threshold level, the compiler inserts inline code to check for the contiguity of an array at runtime (step 914), and the process terminates. In response to creating a stub routine for checking storage contiguity, the compiler creates a structure variable, such as structure variable 500 in FIG. 5, and aliasing information between the new arguments for the structure variable and the original argument for the subroutine (step 916). Creating accurate aliasing information permits the optimizer for the compiler to conduct inter-procedural analysis, the decisions regarding the retention or deletion of arguments listed for subroutines and stub routines. If the compiler is inaccurate in creating aliasing information, the optimizer for the compiler may remove the needed storage in a caller, a subroutine or a stub routine, because the code calling the subroutine or stub routine did not declare the needed arguments properly. In addition to creating a structure variable and aliasing information between the new arguments for the structure variable and the original argument for the subroutine, the compiler replaces a call to the subroutine with a call to the stub routine, wherein the call to the stub routine include the arguments from the call to the subroutine (step 918). When a compiler creates stub routines for checking storage contiguity and creates aliasing information between new arguments for structure variables and original arguments for the subroutine, control flow analysis for software code may be simplified for the optimizer for a compiler. Simplified control flow analysis for software code may result in a compiler producing more efficient code.

Figure 10:
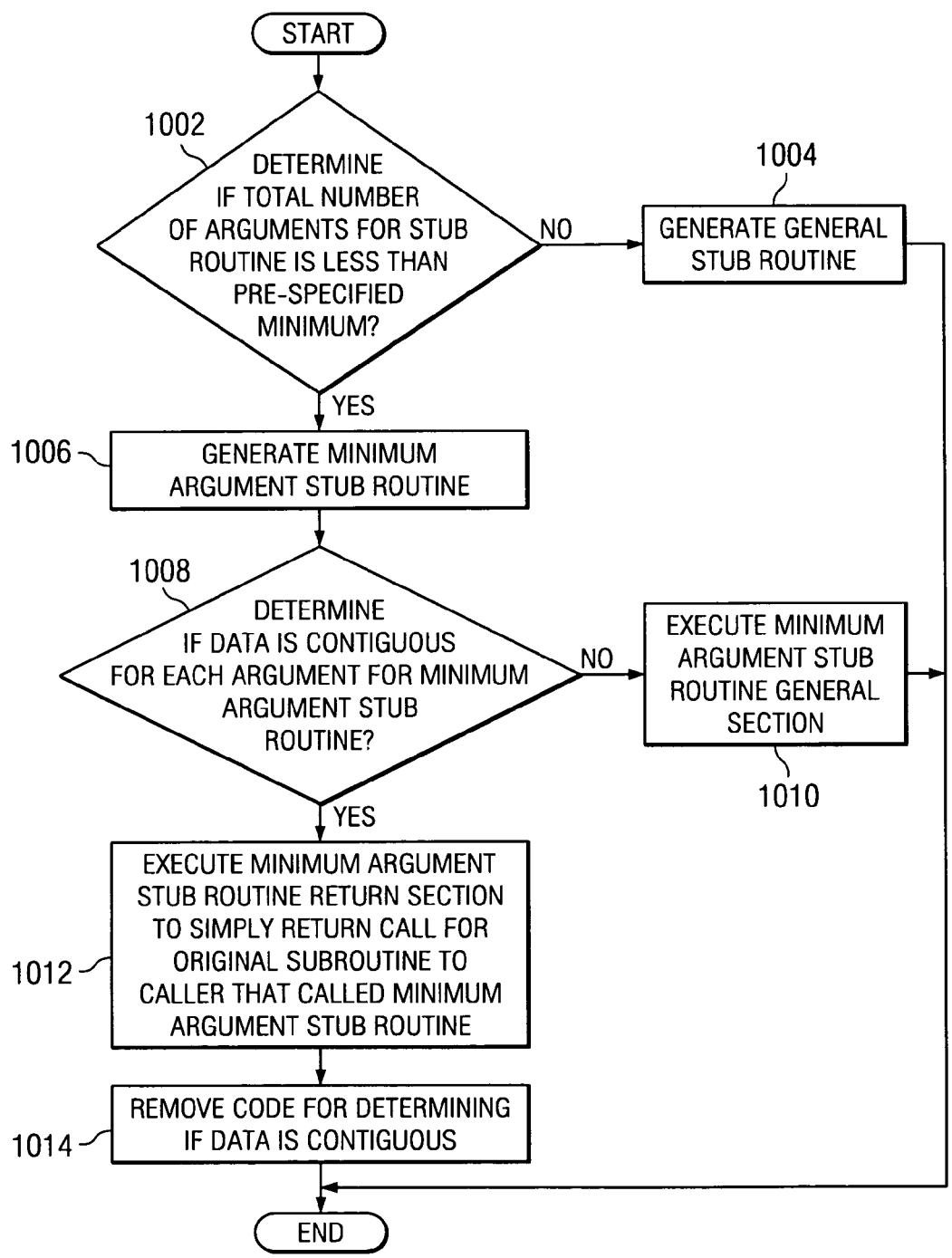
FIG. 10 is a flowchart of a process for determining whether further improvements in simplification may be made to the process for creating a stub routine in accordance with an illustrative embodiment of the present invention.

FIG. 10 is a flowchart of a process for determining whether further improvements in simplification may be made to the process for creating a stub routine in accordance with an illustrative embodiment of the present invention. The process in FIG. 10 is a description of steps comprised in step 912 in FIG. 9 and the steps that may follow the steps comprised in step 912. The compiler determines if the total number of arguments for a stub routine is less than a pre-specified minimum (step 1002). If the total number or arguments for the stub routine is not less than a pre-specified minimum, then further improvements in simplification may not be possible. If the compiler determines that the total number of arguments for the stub routine is not less than a pre-specified minimum, the compiler generates a general stub routine (step 1004), such as stub routine 600 in FIG. 6, and the process terminates. If the compiler determines that the total number of arguments for the stub routine is less than a pre-specified minimum, the compiler generates a minimum argument stub routine (step 1006), such as stub routine 700 in FIG. 7. A minimum argument stub routine is a stub routine that contains code for a general section and separate code for a return section. These stub routine sections are described below. Later, at runtime, the process executes the minimum argument stub routine to determine whether data is contiguous for each argument for the minimum argument stub routine (step 1008). If at runtime the minimum argument stub routine determines that data is not contiguous for each argument for the minimum argument stub routine, the minimum argument stub routine executes a minimum argument stub routine general section (step 1010). This minimum argument stub routine general section is similar to a general stub routine such as stub routine section 702 in FIG. 7 and the process terminates after execution because further improvements in simplification may not be possible. If later at runtime the minimum argument stub routine determines that data is contiguous for each argument for the minimum argument stub routine, the minimum argument stub routine executes a minimum argument stub routine return section, such as stub routine section 704 in FIG. 7, to simply return a call for the original subroutine to the caller that called the minimum argument stub routine (step 1012). The minimum argument stub routine also includes a general section of code for determining if data is contiguous. However, this general section of code is not executed when data is contiguous for each argument, such that at a high level optimization an optimizer for a compiler may modify the minimum argument stub routine by removing the general section for determining if data is contiguous (step 1014).

FIG. 11 is a flowchart of a process for calling a stub routine to check storage contiguity in accordance with an illustrative embodiment of the present invention. After the optimizer for the compiler uses the simplified control flow graph for software code to produce simplified code, the simplified code is executed in which stub routines are called instead of subroutines. The simplified code is a simplified form of code such as software code 402 in FIG. 4. The simplified code determines if an argument is an array pointer with a descriptor (step 1102). If the simplified code determines the argument is an array pointer with a descriptor, the simplified code stores a zero in the first field of a structure variable, which may be the same as % addr_tmp 502 in FIG. 5, and stores the address of the descriptor for the array pointer in the second field of the structure variable, which may be the same as % addr_desc 504 in FIG. 5 (step 1104). If the simplified code determines the argument is not an array pointer with a descriptor, the simplified code determines if the argument is an array (step 1106). If the simplified code determines that the argument is an array, the simplified code stores the address of the array in the first field of the structure variable, and stores a zero in the second field of the structure variable (step 1108). If the simplified code determines that the argument is not an array, the process terminates. If the simplified code determines that the argument is an array pointer or an array, the simplified code replaces the original argument with the stored structure variable, which may be the same as TS 500 in FIG. 5, and passes the structure variable as an argument to a stub routine in a stub routine call, which may be the same as stub routine call 506 in FIG. 5 (step 1110).

FIG. 12 is a flowchart of a process for a stub routine that checks storage contiguity in accordance with an illustrative embodiment of the present invention. The stub routine, such as stub routine 600 in FIG. 6, may be implemented for software code, such as software code 402 in FIG. 4. The stub routine receives arguments passed by the caller of the stub routine, and the arguments may be the same as structure variable TS 500 in FIG. 5 (step 1202). The stub routine checks the first field of the structure variable, which may be the same as % addr_tmp 604 in FIG. 6, in the argument received to determine if the first field of the structure variable is zero (step 1204). If the stub routine determines that the first field of the structure variable is not zero, the argument is an array. If the argument is an array, the address of the array is already in the first field of the structure variable. The stub routine passes the argument with the address in the first field of the structure variable to the subroutine call (step 1206).

If the stub routine determines that the first field of the structure variable is zero, the argument is for an array pointer with a descriptor. Then stub routine checks the second field of the structure variable, which may be the same as % addr_desc 608 in FIG. 6, for the address of the descriptor for the array pointer in order to determine if the array pointer points to contiguous storage (step 1208). The stub routine checks a contiguity bit in the descriptor for the array pointer to determine if the array pointer points to contiguous storage (step 1210). If the stub routine determines that the array pointer points to contiguous storage, the stub routine stores the address of the contiguous storage in the first field of the structure variable (step 1212) and passes the argument with the address in the first field of the structure variable to the original subroutine (step 1206).

If the stub routine determines that the array pointer does not point to contiguous storage, the stub routine allocates a contiguous temporary storage, stores the address of the contiguous temporary storage into the first field of the structure variable (step 1214) and copies from the non-contiguous storage to the contiguous temporary storage (step 1216). The stub routine passes the argument with the address of the contiguous temporary storage in the first field of the structure variable to the original subroutine (step 1206). In response to a return from the subroutine call, the stub routine determines if the array pointer passed to the stub routine points to non-contiguous storage (step 1218). If the stub routine determines that the array pointer points to non-contiguous storage, the stub routine copies from the contiguous temporary storage to the non-contiguous storage (step 1220). The implementation of this process for a stub routine checking storage contiguity may simplify control flow analysis for software code.

Thus, the aspects of the present invention provide a computer implemented method, apparatus, and computer usable program code that may simplify control flow analysis for software code by creating stub routines for checking storage contiguity. The creation of stub routines for checking storage contiguity may also reduce the problems associated with the insertion of inline code. Although the method, apparatus, and computer usable program code have been described above in some detail for the purposes of clarity of understanding, variations and modifications may be made thereto without departing from the scope of the invention.

The invention can take the form of an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the embodiments of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for simplifying compiler-generated software code, the computer implemented method comprising:

generating a stub routine for a subroutine;

replacing a subroutine call in the software code with a stub routine call for the stub routine, wherein the subroutine call has at least one argument; and executing the software code by at least one processing unit, wherein executing the software code comprises:

receiving, by the stub routine, the at least one argument from the stub routine call;

determining whether the at least one argument for the subroutine call comprises an array pointer;

checking a descriptor for the array pointer to determine whether the array pointer points to a contiguous storage or a non-contiguous storage;

responsive to a determination that the at least one argument comprises an array pointer that points to a non-contiguous storage, allocating a contiguous temporary storage, copying the non-contiguous storage to the contiguous temporary storage and passing, by the stub routine, an address of the contiguous temporary storage to the subroutine.

2. The computer implemented method of claim 1, further comprising, for each subroutine, prior to generating the stub routine for such subroutine:

determining if a subroutine property indicates that the subroutine is a user subroutine;

responsive to a determination that the subroutine property indicates that the subroutine is a user subroutine, determining if an argument attribute indicates that at least one argument for a subroutine call for that subroutine comprises an array pointer;

responsive to a determination that an argument attribute indicates that at least one argument for the subroutine call comprises an array pointer, for each instance of the user subroutine call, incrementing a number of user subroutine calls for which at least one argument for the subroutine calls comprises an array pointer;

determining if any other subroutine has a subroutine property and an argument attribute to be determined;

responsive to a determination that at least one other subroutine has a subroutine property and an argument attribute to be determined, returning to a step for determining if the subroutine property for the other subroutine indicates that the other subroutine is a user subroutine;

responsive to a determination that no other subroutine has a subroutine property and an argument attribute to be determined, determining if the number of user subroutine calls for which at least one argument for the user subroutine calls comprises an array pointer is greater than a threshold level; and responsive to a determination that the number of user subroutine calls for which at least one argument for the subroutine calls comprises an array pointer is greater than the threshold level, forming a determination that the stub routine should be generated.

3. The computer implemented method of claim 1, wherein generating the stub routine for the subroutine comprises:

determining if a number of arguments for the stub routine is less than a pre-specified minimum;

responsive to a determination that the number of arguments for the stub routine is less than the pre-specified minimum, determining whether data is contiguous for each argument for the stub routine; and responsive to a determination that data is contiguous for each argument for the stub routine, modifying the stub routine to return the subroutine call to a caller that called the stub routine.

4. The computer implemented method of claim 1, wherein executing the software code comprises:

determining if at least one argument for the subroutine call comprises an array; and responsive to a determination that at least one argument for the subroutine call comprises an array, passing to the subroutine as an argument for the subroutine call an address of each such array.

5. The computer implemented method of claim 4, wherein executing the software code further comprises:

in response to a return from the subroutine call, determining if an array pointer points to the non-contiguous storage;

responsive to each determination that an array pointer points to the non-contiguous storage, copying to that non-contiguous storage from its associated contiguous temporary storage.

6. The computer implemented method of claim 1, wherein generating the stub routine for the subroutine comprises:

determining whether to generate the stub routine for the subroutine prior to generating the stub routine, wherein determining whether to create the stub routine comprises:

determining whether the subroutine is a subroutine generated by a user;

responsive to a determination that the subroutine is a subroutine generated by a user, determining whether at least one argument for the subroutine generated by a user comprises an array pointer;

responsive to a determination that the least one argument for the subroutine generated by a user comprises an array pointer, incrementing a number of user subroutine calls for each argument for the subroutine generated by the user that comprises an array pointer;

determining if any other subroutine was generated by a user;

responsive to a determination that at least one other subroutine was generated by a user, returning to a step for determining whether the subroutine property for the at least one other subroutine indicates that the at least one other subroutine is a subroutine generated by a user;

responsive to a determination that no other subroutine was generated by a user, determining whether the number of user subroutine calls for each argument of each subroutine generated by a user that comprises an array pointer is greater than a threshold level; and responsive to a determination that the number of user subroutine calls is greater than the threshold level, forming a determination that the stub routine should be generated for the subroutine.

7. A data processing system for simplifying compiler-generated software code, comprising:

a bus, a storage device coupled to the bus, wherein the storage device contains computer usable code;

a communications unit coupled to the bus; and a processing unit coupled to the bus, wherein the processing unit executes the computer usable code to:

generate a stub routine for a subroutine, replace a subroutine call in the software code with a stub routine call for the stub routine, wherein the subroutine call has at least one argument, and execute the software code, wherein executing the software code comprises the processing unit further executing the computer usable code to:

receive at the least one argument from the stub routine call, determine whether the at least one argument for the subroutine call comprises an array pointer, check a descriptor for the array pointer to determine whether the array pointer points to a contiguous storage or a non-contiguous storage, allocate a contiguous temporary storage, copy the non-contiguous storage to the contiguous temporary storage and pass an address of the contiguous temporary storage to the subroutine in response to a determination that the at least one argument comprises an array pointer that points to a non-contiguous storage.

8. The data processing system of claim 7, wherein the processing unit further executes the computer usable code to:

determine, for each subroutine, prior to generating the stub routine for such subroutine, if a subroutine property indicates that the subroutine is a user subroutine, determine if an argument attribute indicates that at least one argument for a subroutine call for that subroutine comprises an array pointer in response to a determination that the subroutine property indicates that the subroutine is a user subroutine, increment, for each instance of the user subroutine call, a number of user subroutine calls for which at least one argument for the subroutine calls comprises an array pointer in response to a determination that an argument attribute for the user subroutine indicates that at least one argument for the user subroutine comprises an array pointer, determine if any other subroutine has a subroutine property and an argument attribute to be determined, return to the computer usable code to determine if the subroutine property for the other subroutine indicates that the other subroutine is a user subroutine in response to a determination that at least one other subroutine has a subroutine property and an argument attribute to be determined, determine if the number of user subroutine calls for which at least one argument for the user subroutine calls comprises an array pointer is greater than a threshold level in response to a determination that no other subroutine has a subroutine property and an argument attribute to be determined, and form a determination that the stub routine should be generated in response to a determination that the number of user subroutine calls for which at least one argument for the subroutine calls comprises an array pointer is greater than the threshold level.

9. The data processing system of claim 7, wherein the processing unit further executes the computer usable code to:
computer usable code to determine if a number of arguments for the stub routine is less than a pre-specified minimum, determine whether data is contiguous for each argument for the stub routine in response to a determination that the number of arguments for the stub routine is less than the pre-specified minimum, and modify the stub routine to return the subroutine call to a caller that called the stub routine in response to a determination that data is contiguous for each argument for the stub routine.

10. The data processing system of claim 7, wherein the processing unit executing the computer usable code to execute the software code comprises the processing unit further executing the computer usable code to:
determine if at least one argument for the subroutine call comprises an array, and pass to the subroutine as an argument for the subroutine call an address of each such array in response to a determination that at least one argument for the subroutine call comprises an array.

11. The data processing system of claim 10, wherein the processing unit executing the computer usable code to execute the software code comprises the processing unit further executing the computer usable code to:
determine if an array pointer points to the non-contiguous storage in response to a return from the subroutine call, and copy to the non-contiguous storage from its associated contiguous temporary storage in response to each determination that an array pointer points to that non-contiguous storage.

12. The data processing system of claim 7, wherein the processing unit executing the computer usable code to generate the stub for the subroutine comprises the processing unit further executing the computer usable code to:
determine whether to generate the stub routine for the subroutine prior to generating the stub routine, wherein determining whether to create the stub routine comprises the processing unit further executing the computer usable code to:
determine whether the subroutine is a subroutine generated by a user,
determine whether at least one argument for the subroutine generated by a user comprises an array pointer to in response to a determination the subroutine is a subroutine generated by a user,
increment, a number of user subroutine calls for each argument for the subroutine generated by the user that comprises an array pointer in response to a determination that the at least one argument for the subroutine generated by a user comprises an array pointer,
determine if any other subroutine was generated by a user,
return to the computer usable program code to determine whether the subroutine property for at least one other subroutine indicates that the at least one other subroutine is a subroutine generated by a user in response to a determination that the at least one other subroutine was generated by a user,
determine whether the number of user subroutine calls for each argument of each subroutine generated by a user that comprises an array pointer is greater than a threshold level in response to a determination that no other subroutine was generated by a user, and
form a determination that the stub routine should be generated for the subroutine in response to a determination that the number of user subroutine calls is greater than the threshold level.

13. A computer program product for simplifying compiler-generated software code, the computer program product comprising:
a computer usable storage medium having computer usable program code embodied therein;
computer usable program code configured to generate a stub routine for a subroutine, wherein the stub routine is used to determine whether data is contiguous for the subroutine;
computer usable program code configured to replace a subroutine call in the software code with a stub routine call for the stub routine, wherein the subroutine call has at least one argument and the stub routine call includes each at least one argument from the subroutine call; and
computer usable program code configured to execute the software code, wherein the stub routine is called by the stub routine call to determine whether data is contiguous for the subroutine, and wherein the computer usable program code configured to execute the software code comprises:
computer usable program code configured to determine if at least one argument for the subroutine call comprises an array pointer;
computer usable program code configured to determine if at least one argument for the subroutine call comprises an array;
computer usable program code configured to pass to the subroutine as an argument for the subroutine call an address of each such array in response to a determination that at least one argument for the subroutine call comprises an array;
computer usable program code configured to check a descriptor for each such array pointer to determine whether each such array pointer points to a contiguous storage or a non-contiguous storage in response to a determination that at least one argument for the subroutine call comprises an array pointer;
computer usable program code configured to pass to the subroutine as an argument for the subroutine call an address of each such contiguous storage in response to a determination that at least one of the array pointers points to a contiguous storage;

computer usable program code configured to allocate an associated contiguous temporary storage for each such non-contiguous storage in response to a determination that at least one of the array pointers points to a non-contiguous storage;

computer usable program code configured to copy from each such non-contiguous storage to its associated contiguous temporary storage in response to allocating each associated contiguous temporary storage; and computer usable program code configured to pass to the subroutine as an argument for the subroutine call an address of each such contiguous temporary storage in response to copying from each such non-contiguous storage to its associated contiguous temporary storage.

14. The computer program product of claim 13, further comprising:

computer usable program code configured to determine, for each subroutine, prior to generating the stub routine for such subroutine, if a subroutine property indicates that the subroutine is a user subroutine;

computer usable program code configured to determine if an argument attribute indicates that at least one argument for a user subroutine call for that subroutine comprises an array pointer in response to a determination that the subroutine property indicates that the subroutine is a user subroutine;

computer usable program code configured to increment, for each instance of the user subroutine call, a number of user subroutine calls for which at least one argument for the subroutine calls comprises an array pointer in response to a determination that an argument attribute for the user subroutine indicates that at least one argument for the subroutine call comprises an array pointer;

computer usable program code configured to determine if any other subroutine has a subroutine property and an argument attribute to be determined;

computer usable program code configured to return to the computer usable program code configured to determine if the subroutine property for the other subroutine indicates that the other subroutine is a user subroutine in response to a determination that at least one other subroutine has a subroutine property and an argument attribute to be determined;

computer usable program code configured to determine if the number of user subroutine calls for which at least one argument for the user subroutine calls comprises an array pointer is greater than a threshold level in response to a determination that no other subroutine has a subroutine property and an argument attribute to be determined; and computer usable program code configured to form a determination that the stub routine should be generated in response to a determination that the number of user subroutine calls for which at least one argument for the subroutine calls comprises an array pointer is greater than the threshold level.

15. The computer program product of claim 13, wherein generating the stub routine for the subroutine comprises:

computer usable program code configured to determine if a number of arguments for the stub routine is less than a pre-specified minimum;

computer usable program code configured to determine whether data is contiguous for each argument for the stub routine in response to a determination that the number of arguments for the stub routine is less than the pre-specified minimum; and computer usable program code configured to modify the stub routine to return the subroutine call to a caller that called the stub routine in response to a determination that data is contiguous for each argument for the stub routine.

16. The computer program product of claim 13, wherein computer usable program code configured to execute the software code further comprises:

computer usable program code configured to determine if an array pointer points to the non-contiguous storage in response to a return from the subroutine call; and computer usable program code configured to copy to the non-contiguous storage from its associated contiguous temporary storage in response to each determination that an array pointer points to that non-contiguous storage.

17. The computer program product of claim 13, wherein the computer usable program code configured to generate the stub for the subroutine comprises:

computer usable program code configured to determine whether to generate the stub routine for the subroutine prior to generating the stub routine, wherein determining whether to create the stub routine comprises:

computer usable program code configured to determine whether subroutine is a subroutine generated by a user;

computer usable program code configured to determine whether at least one argument for the subroutine generated by a user comprises an array pointer in response to a determination that the subroutine is a subroutine generated by a user;

computer usable program code configured to increment a number of user subroutine calls for one each argument for the subroutine generated by the user that comprises an array pointer in response to a determination that the at least one argument for the subroutine generated by a user comprises an array pointer;

computer usable program code configured to determine if any other subroutine was generated by a user;

computer usable program code configured to return to the computer usable program code configured to determine whether the subroutine property for at least one other subroutine indicates that the at least one other subroutine is a subroutine generated by a user in response to a determination that the at least one other subroutine was generated by a user;

computer usable program code configured to determine whether the number of user subroutine calls for each argument of each subroutine generated by a user that comprises an array pointer is greater than a threshold level in response to a determination that no other subroutine was generated by a user; and computer usable program code configured to form a determination that the stub routine should be generated for the subroutine in response to a determination that the number of user subroutine calls is greater than the threshold level.

* * * * *